United States Patent [19]
Schoettle et al.

[11] Patent Number: 5,293,292
[45] Date of Patent: Mar. 8, 1994

[54] MAGNETIC TAPE CASSETTES AND A SEPARATE HOUSING PART THEREFOR

[75] Inventors: Klaus Schoettle, Heidelberg; Joachim Eberhard, Kippenheim; Kurt Schmidts, Schwanau; Bozidar Pavelka, Willstaett, all of Fed. Rep. of Germany

[73] Assignee: BASF Magnetics GmbH, Mannheim, Fed. Rep. of Germany

[21] Appl. No.: 780,503

[22] Filed: Oct. 22, 1991

[30] Foreign Application Priority Data

Oct. 25, 1990 [DE] Fed. Rep. of Germany ....... 9014774

[51] Int. Cl.$^5$ ............................................. G11B 23/12
[52] U.S. Cl. .................................... 360/132; 242/199
[58] Field of Search ......................... 360/132; 242/199

[56] References Cited

U.S. PATENT DOCUMENTS

| | | | |
|---|---|---|---|
| 3,796,394 | 3/1974 | Souza | 242/199 |
| 3,892,727 | 7/1975 | Carvajal et al. | 360/132 |
| 3,912,194 | 10/1975 | Chan | 242/199 |
| 4,079,499 | 3/1978 | Bagozzi | 242/199 |
| 4,618,903 | 10/1986 | Oishi et al. | 360/132 |
| 4,633,354 | 12/1986 | Oishi et al. | 360/132 |
| 4,694,369 | 9/1987 | Ramsay | 360/132 |
| 4,809,928 | 3/1989 | Hoffrichter et al. | 242/199 |
| 5,088,656 | 2/1992 | Yamamoto et al. | 242/199 |

Primary Examiner—Edward P. Westin
Assistant Examiner—Jon Santamauro
Attorney, Agent, or Firm—Keil & Weinkauf

[57] ABSTRACT

A magnetic tape cassette is provided with a raised housing part. The conventional two-part housing of such a cassette is formed by essentially planar housing parts connected to one or more third separate housing parts which can be suitably connected to and/or can connect the planar housing parts. The position of the tape guide elements can be improved for all cassettes of this raised housing part type.

14 Claims, 6 Drawing Sheets

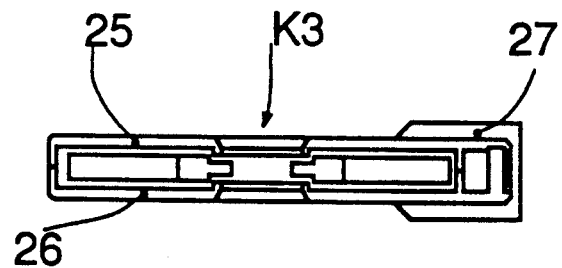
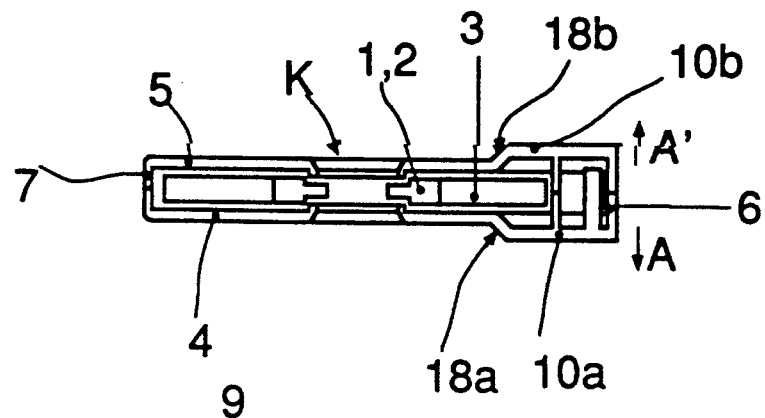
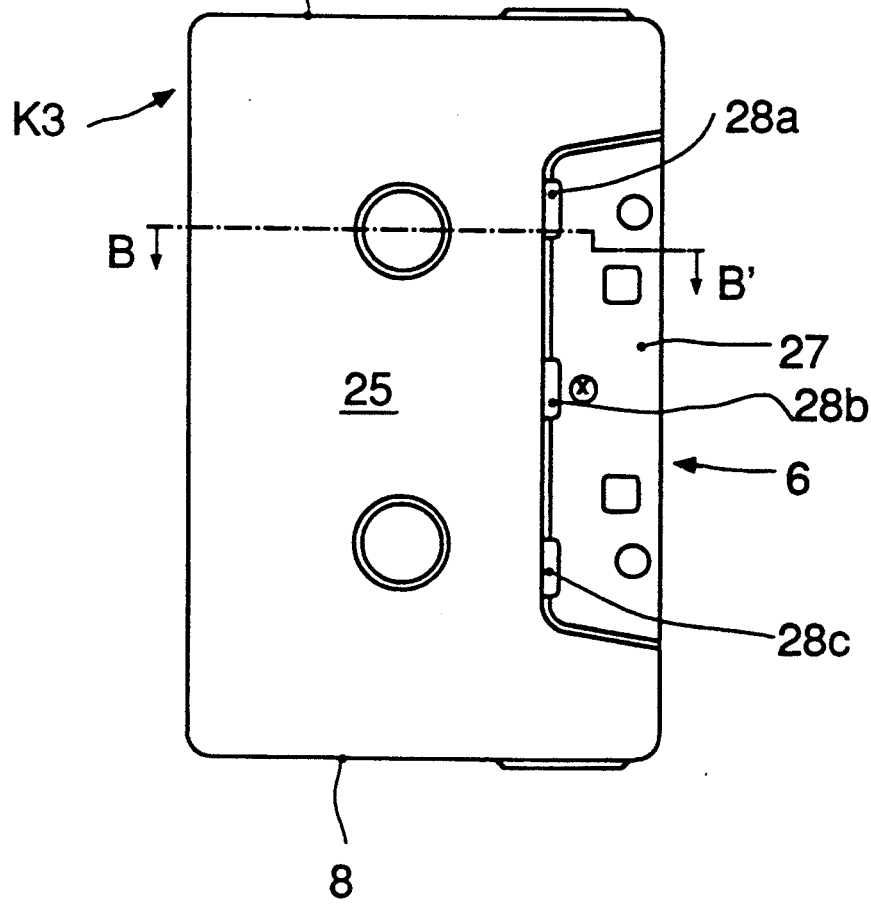

FIG.11 (A) (B)

MAGNETIC TAPE CASSETTES AND A SEPARATE HOUSING PART THEREFOR

The present invention relates to a magnetic tape cassette, in particular a compact cassette, consisting of two rotatably mounted coplanar hubs and a magnetic tape which can be wound and unwound between the hubs, and housing halves having bottom and lid walls and front, back and side walls, the housing halves having a raised housing part adjacent to the front wall for accepting the one or more heads, and a separate housing part therefor.

In Compact Cassettes according to DIN 45,516 (June 1976), the raised housing part starts from the center of the cassette and extends symmetrically to both sides and corresponds in length roughly to two thirds of the length of the front wall, the raised housing part being adjacent to the front wall. Three orifices for accepting heads are arranged in the region of the raised housing part. Guide elements for the magnetic tape are likewise provided in the region of the raised housing part, the recording/playback quality of the cassette depending substantially on said elements. The customary use of relatively cheap plastic in combination with shaping of the raised housing part leads to bending of the housing halves, particularly under the influence of heat, with the result that the position of the guide elements is also changed and hence cassettes of poorer quality are produced.

It is an object of the present invention to avoid the disadvantages of the known magnetic tape cassettes, in particular for mass production thereof.

We have found that this object is achieved by a magnetic tape cassette, in particular a compact cassette, consisting of two rotatably mounted coplanar hubs and a magnetic tape which can be wound and unwound between the hubs, and housing halves having bottom and lid walls and front, back and side walls, the housing halves having a raised housing part adjacent to the front wall for accepting the one or more heads, if the housing parts forming the bottom and lid walls of the housing halves are essentially planar and the raised housing part is in the form of one or more separate housing parts suitable for being connected to the essentially planar housing parts.

Consequently, a high quality product can be produced at relatively low expense, which is possible while avoiding inhomogeneity which affects the planarity of the inner surfaces, said inhomogeneity occurring, for example, as a result of the step formation in the compact cassette.

The one or more housing parts can advantageously be connected to the essentially planar housing parts (referred to below as planar housing parts) by means of one or more press-stud or clamping connections.

Connection by adhesive bonding, welding and/or screwing is also possible.

If two separate housing parts are present, each of the separate housing parts may also be connected to one of the planar housing parts.

It is also possible for a separate housing part having an essentially U-shaped side view and cross-section to be connected to two planar housing parts.

The separate housing part or parts is or are advantageously produced from a thermoplastic which can be injection molded.

Such plastics can also be rendered conductive by the addition of conductivity-enhancing powders, for example carbon powder.

However, the separate housing part may also be produced from magnetically shielding metal, in particular from magnetically soft metal or magnetically soft metal alloy.

The one or more separate housing parts may also consist of plastic and/or metal material whose color differs from that of the planar housing parts. It may also be advantageous to provide positioning webs on the inner wall (or walls) of the separate housing part (or parts), which webs interact with corresponding indentations/webs on the outside of the planar housing parts.

This permits particularly easy assembly of the cassette in spite of very high precision in the allocation of the separate and planar housing parts.

It may furthermore be advantageous to provide ribs at right angles to the length of the front, close to the front orifices of the single-piece or assembled separate housing parts, for restricting the free space of the tape loop. This makes it possible substantially to avoid assembly waste due to jamming of the tape.

It is also advantageous for the stability of the housing if the planar housing parts possess, in the region of the one or more housing parts, wall parts which are positively connected to one another.

For design and assembly reasons, it may also be advantageous for the one or more housing parts to consist of plastic and/or metal material which is of a color which differs from that of the planar housing parts.

Furthermore said one part housing part of substantial U-form in its side view can advantageously be used itself as a connecting means for the two planar housing parts.

In this embodiment said housing part can consist of elastically resilient material for providing a clamping force. Such material could be a resilient thermoplastic material or an elastic metal.

The separate housing part for a cassette, in particular a compact cassette, consisting of two coplanar, rotatably mounted hubs and a magnetic tape which can be wound and unwound between the hubs, and housing parts having bottom and lid walls and back and side walls, and guide elements for the magnetic tape guided along behind front orifices of the cassette, is itself also the subject of the invention if it is in the form of a housing part connecting the housing parts and has front orifices for the entry of at least one head.

In a practical embodiment, the separate housing part is formed with at least one snap, button or clamping connection for connection to the housing parts, permitting the realization of detachable connections. In an advantageous embodiment, the separate housing part has a U-shape in side view and/or in cross-section.

Advantageously, the separate housing part can be provided on the inner wall with positioning webs for cooperating with corresponding indentations or webs on the outside of the housing parts.

In practice, it is also possible to provide, close to the front orifices, ribs for restricting and guiding the magnetic tape guided along the front orifices, in order additionally to improve the tape guidance close to the head.

In addition, it is advantageous from the production point of view if the separate housing part consists of a plastic which can be injection molded by a thermoplastic method. In order to achieve shielding effects in the region of the head, the separate housing part may consist of plastic with metal particles or a metal coating or of metal, in particular a magnetically soft metal or a magnetically soft metal alloy.

The separate housing part may also consist of plastic and/or metal material of a color which differs from that of the housing parts in order, for example, to achieve design effects or distinguishing criteria for production.

If the separate housing part is to act as a connecting means, it may consist of flexible or springy material for a clamping connection.

Embodiments of the invention are shown in the drawing and described below.

In the drawing,

FIG. 1 shows a cross-section through a known compact cassette K,

FIG. 2 shows the same cross-section through a novel compact cassette K3 along line B—B' in FIG. 3, FIG. 3 shows a plan view of the compact cassette in FIG. 2, FIG. 4 shows a schematic representation of the novel compact cassette having tape guide and direction-changing elements, FIGS. 5-10 shows examples of fastening of the separate housing part to the planar housing parts, FIG. 11a shows a front view of the separate housing part, FIG. 11b shows a plan view of the separate housing part in FIG. 11a and FIG. 12 shows a partial cross-section through the separate housing part and the planar housing parts with the tape roll present therein.

The known standardized compact cassettes K consist of two rotatably mounted coplanar hubs 1, 2 with magnetic tape 3 which can be wound thereon and unwound therefrom and of housing halves having bottom and lid walls 4 and 5, respectively, and front, back and side walls 6, 7 and 8, the housing halves having a raised housing part 10a, 10b which is adjacent to the front wall 6 and extends backward, for accepting one or more recording/playback heads 11 (FIG. 4). The front wall 6 has two further orifices for accepting further recorder parts, such an erase head 12, a rubber pressure roller 13, etc. To enable these recorder parts to be brought into the required, exactly defined contact with the magnetic tape 3, said tape is conveyed from the tape roll present on the hub 1, in a free tape loop 3a, through guide elements in the cassette, such as direction-changing rollers 14 and guide pins 15, 16 and 17, along the front wall 6 for winding on hub 2, or vice versa if the cassette is operated in the other direction. Small deviations of about 25 μm or more from their vertical position are, in the case of these guide elements 14 to 17, sufficient to lead to substantial azimuthal errors which have a substantially adverse effect on the playback level of audio signals. Because of the steps 18a and 18b which form the raised housing part and have a smaller wall thickness explained below, the housing has an inhomogeneity which cannot be compensated by conventional constructional means. While the wall thicknesses of the bottom and lid walls 4 and 5 covering the tape roll are usually about 1.8 mm, the wall thicknesses of the raised housing parts 10a and 10b are reduced to about 1.0 mm, at least in the region of the orifices in the front wall 6 (referred to below as front orifices). During production by injection molding, the inhomogeneity led to tensions in the material which, under the action of heat, were compensated through bending of the parts 10a and 10b in the directions A and A' (FIG. 1).

FIG. 2 shows the novel cassette K3 in a three-part arrangement, the housing parts 25 and 26 which are essentially planar on the outside and inside being connected by means of a third housing part 27 forming the raised housing part.

In FIG. 3, the third or separate housing part 27, which may readily also comprise a plurality of parts, i.e. two or more parts, is provided on each side with three fastening members or points 28 A to 28 C, which may be of the forms shown in the Examples in FIGS. 5 to 10.

In FIGS. 5 to 10, parts of the bottom wall 5 of the housing are shown with broad shading and the separate housing part 27 with narrow shading.

In FIG. 5, the end of the housing part 27 engages, with a recess 31, under an arch 32 of the bottom wall 5, and a weld 33 is additionally provided.

FIG. 6 shows a hook-like recess 34 connected to a hook-like arch 35 of the bottom wall 5. FIG. 7 corresponds roughly to FIG. 5 but has greater wall thicknesses in the engagement region and has no weld.

FIGS. 8 and 9 each show a snap orifice 36 and 37, respectively, in the bottom wall and a locking peg 38 and 39, respectively, on the separate housing part 27.

FIG. 10 shows a weld 33 as the only means of connection. The embodiments of FIGS. 6 to 9 are shown without welds.

If necessary, it is of course possible to provide welds or adhesive bonds in addition to a mechanical means of connection. It is also possible to use screw unions alone or in conjunction with other fastening means, as substantially used in compact cassettes. This applies in particular to the middle screw shown, for example, in FIG. 3.

The described fastening means of the planar housing part, in this case of the bottom wall 5 of the housing or of the separate housing part 27, are provided locally in accordance with the fastening members 28 A to 28 C. Depending on the quality of shaping of the standardized or other cassettes, it is also possible to use more or less than three fastening members, or the total edges of the separate housing part 27 can be provided with fastening means, which must then have their counterparts on the planar housing parts, although this is not necessary if the fastening is effected by welding or adhesive bonding.

As stated above, the separate housing part 27 may consist of a plurality of parts, in which case the two or more parts should be capable of being connected to one another, for example via a toothed system in a joint at the front of the cassette, so that they cannot move with respect to one another.

The separate housing part can also consist of a single part having a U-shaped side view and cross-section, such as the housing part 40 shown in FIGS. 11a and 11b.

Figure 4:
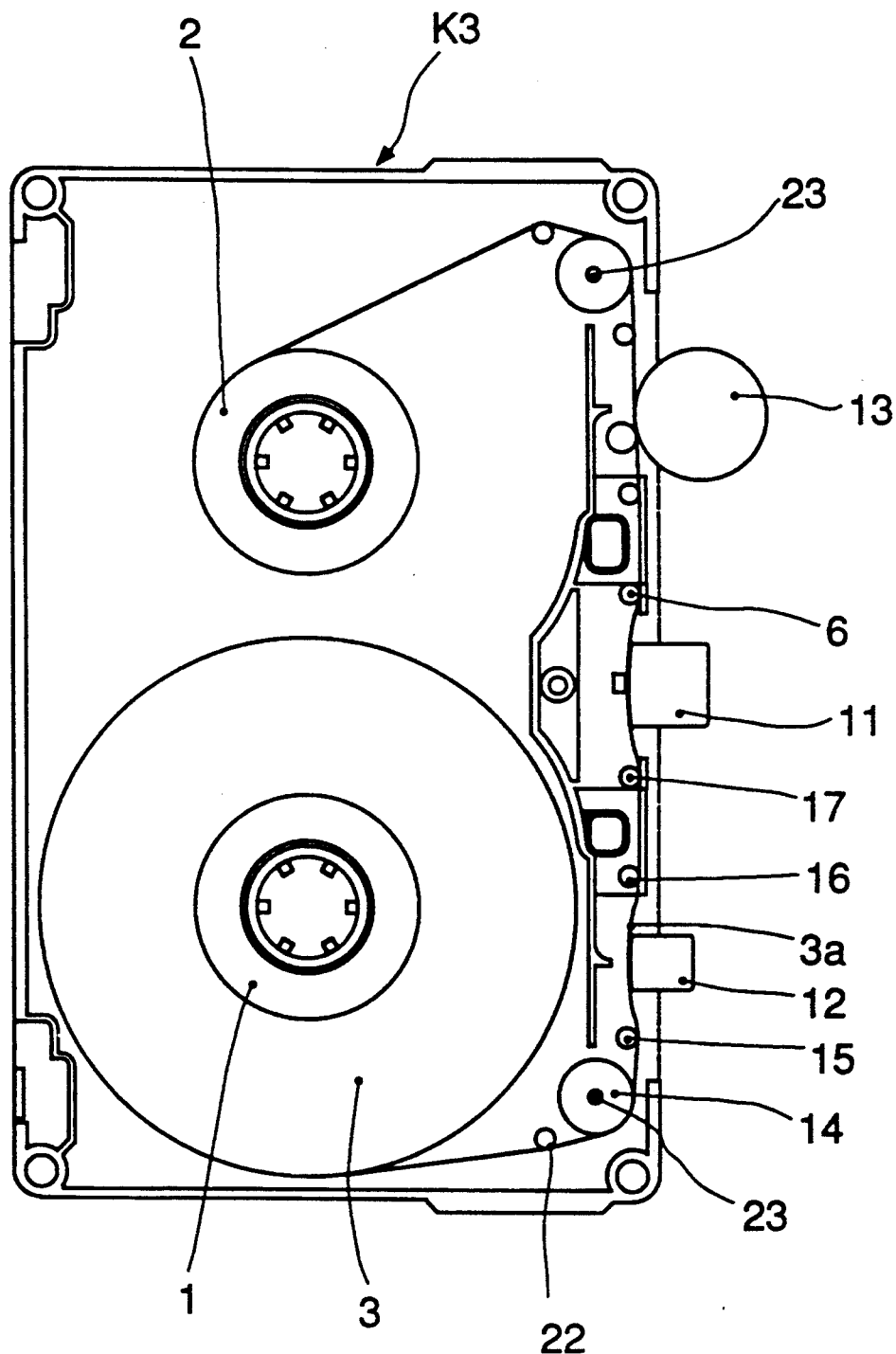
Figure 5:
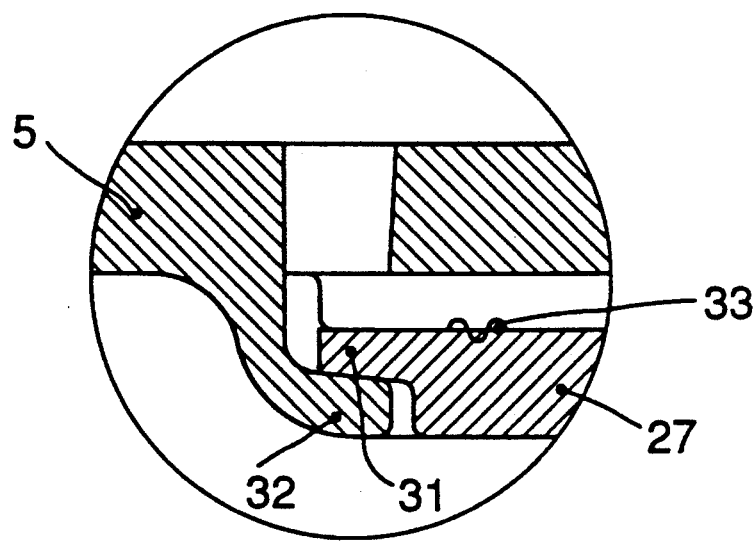
Figure 6:
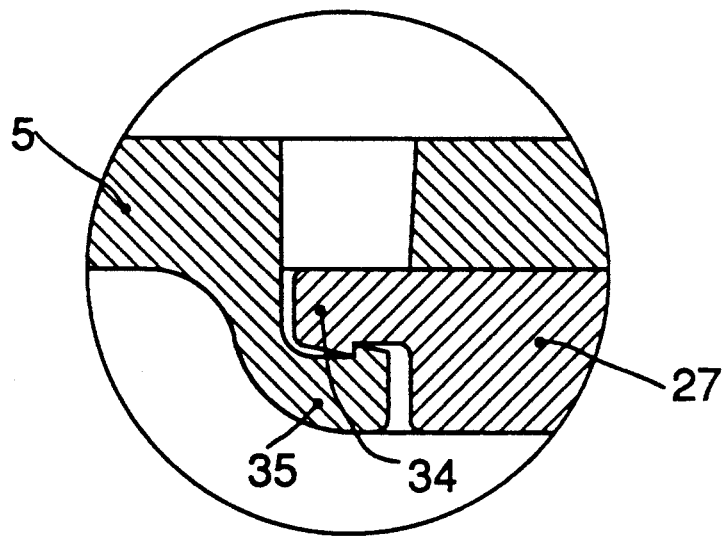
Figure 7:
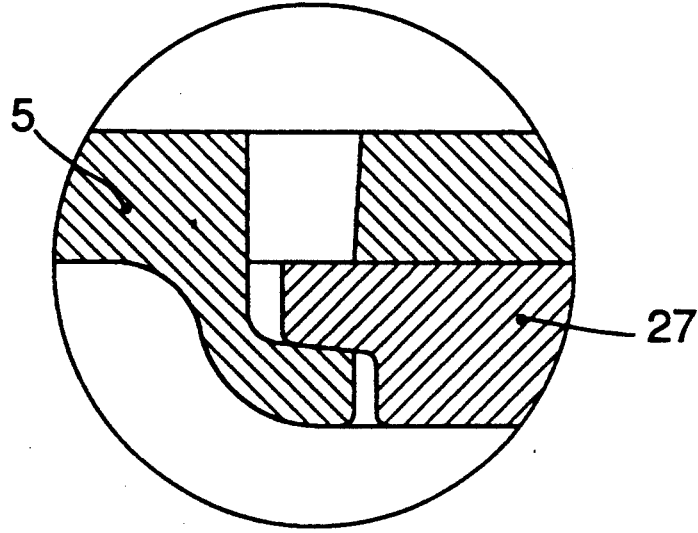
Figure 8:
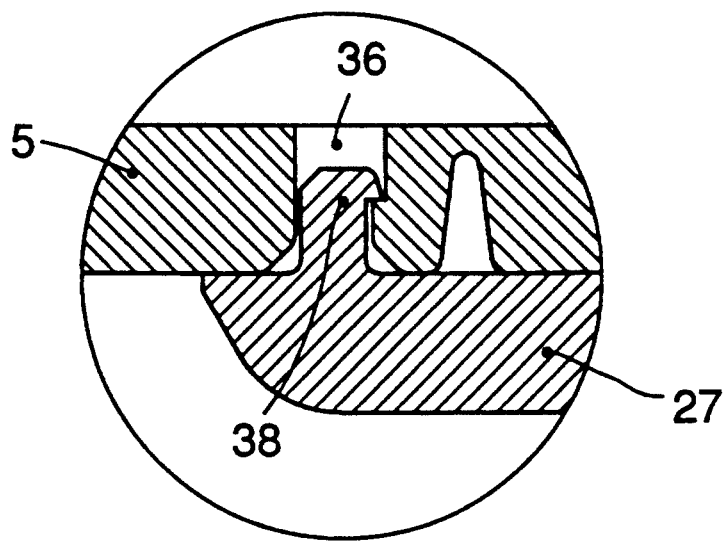
Figure 9:
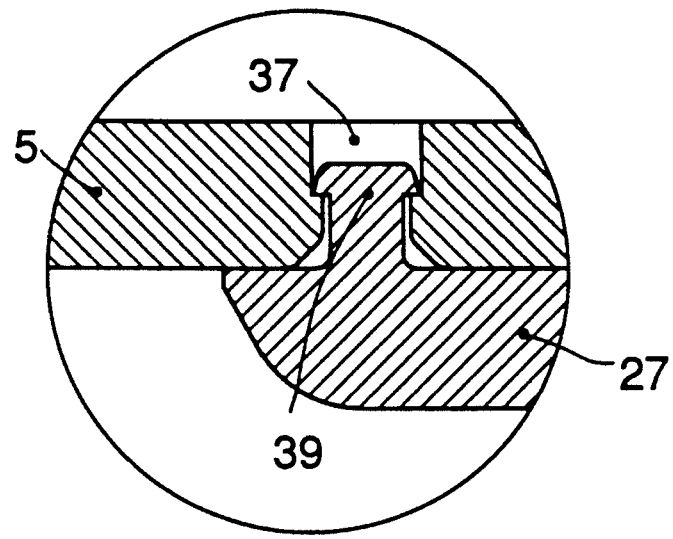
Figure 10:
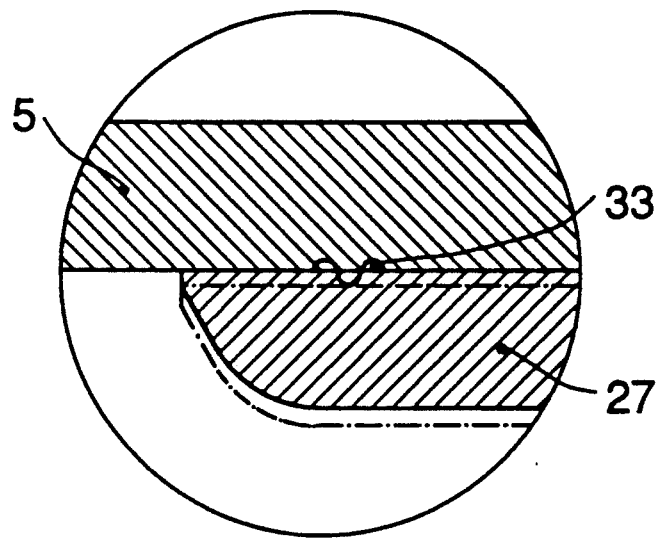
Figure 11:
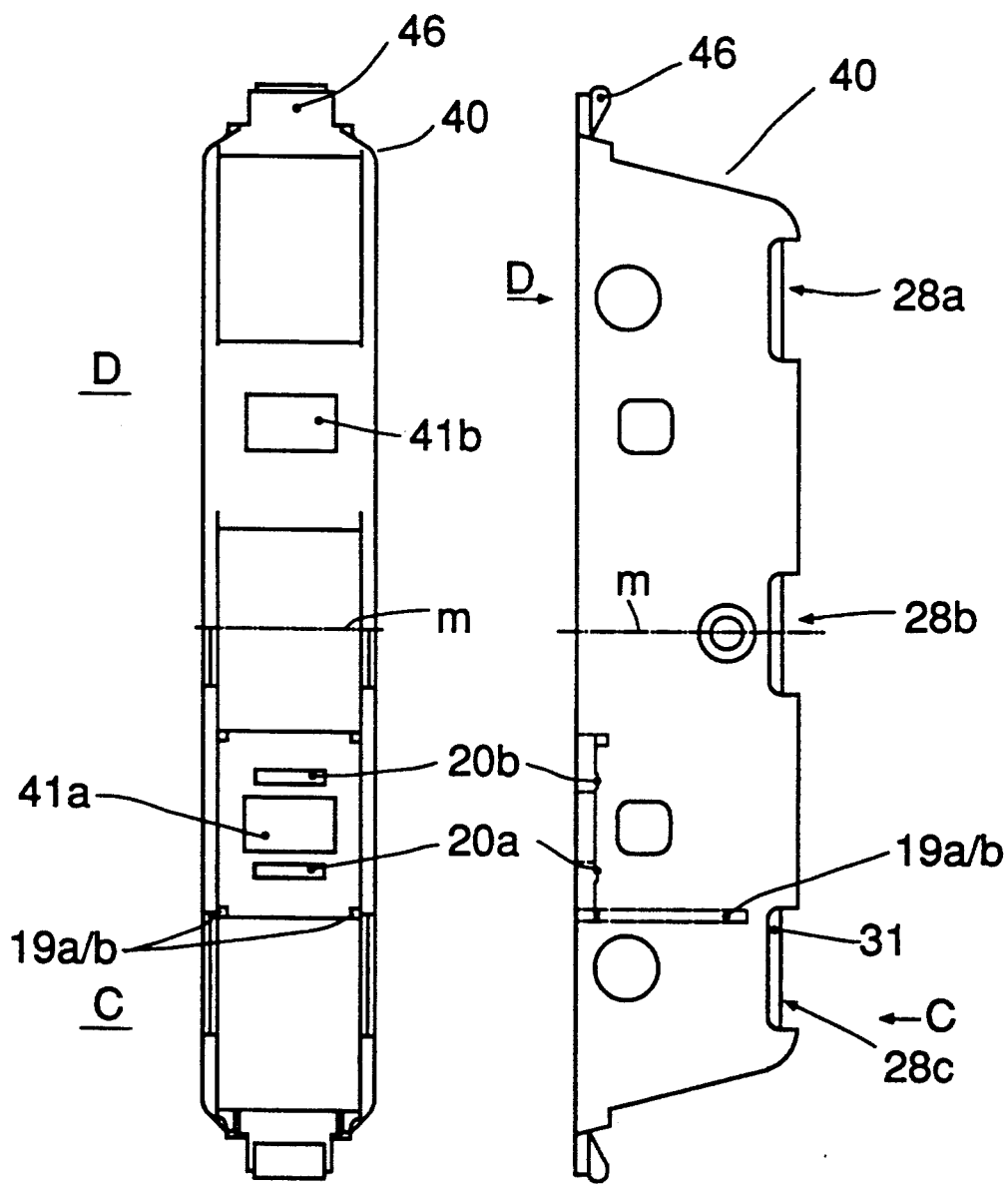
FIG. 11a shows a first view D of the front and a second view C of the back of the open U-shape.
FIG. 11b shows the side view of the U-shape.

The housing part 40 has all holes and/or orifices required for accepting the planar housing parts 25 and 26 and for tape access. If the connecting means described so far (FIGS. 5 to 10) are insufficient, it is possible to use additional assembly means. It is possible to provide, inside the U-shape, longitudinal webs 19 a, b which engage correspondingly arranged outer grooves in one or two of the planar housing parts 25 and 26, which grooves are indicated in FIG. 3. It is also possible, particularly parallel to and close to the two vertical edges of the front orifices 41a and 41b, to provide ribs 20a, b, which are intended to prevent the loose magnetic tape loop 3a (FIG. 4) from jamming in the gap 21a and 21b between the housing part 40 and the planar housing parts 25 and 26. The webs 19 and ribs 20 described are preferably symmetrically arranged with respect to the central line m. Lateral clamping parts 46 may also be provided.

Figure 12:
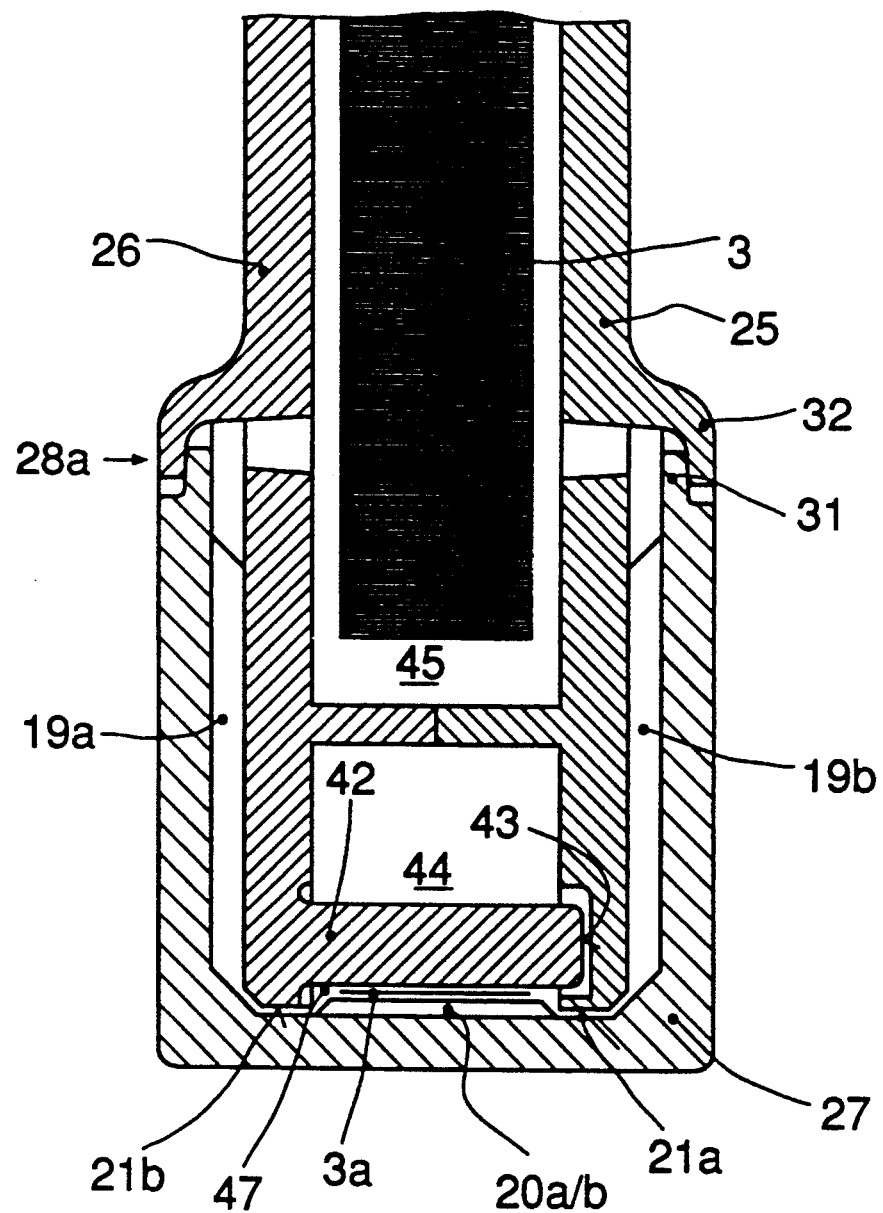

FIG. 12 clearly shows that, in this section (line B—B' in FIG. 3), the tape loop 3 a has a very narrow chamber 47, which is essentially bordered by the ribs 20a, b and the wall 42. In this Example, the wall 42 is part of housing part 26 and engages an indentation 43 in housing part 25 in order to produce a stable positive connection in this front housing region. If the planar housing parts 25 and 26 have an almost identical shape, a relatively large space 45 of constant height for the wound tape 3 results in another section due to engagement of a wall of planar housing part 25 into an allocated indentation in the planar housing part 26, by means of which the relatively small cavity 44 is formed.

The one or more separate housing parts 27, 40 are advantageously produced from a thermoplastic, injection moldable synthetic resin material. It is also possible to make such housing part(s) from metal, e.g. sheet metal.

Owing to the wide range of possible designs, the synthetic resin material or metal may differ in color from the basic housing (consisting of the planar housing parts) and/or consist of a fracture-resistant plastic, for example polycarbonate or polypropylene or polyoxymethylene, etc., in order to increase the fracture resistance of the cassette to a greater or lesser extent. For example, to protect the cassette from external electric and magnetic fields during recording and playback, the separate housing part may be provided with conductive materials in the plastic. It may be produced from shielding metal, in particular from magnetic metal or a magnetically soft metal alloy, to provide protection from magnetic fields.

If the connecting or fastening means between the separate housing part and the planar housing parts are disengageable from one another, it is also possible to use different separate housing parts with regard to material and/or shape, for example having different numbers of front orifices, i.e. to make the same cassette suitable for a broader range of different applications or different apparatuses, for example by means of additional orifices for instance for an additional head capable of reproducing the signals just after their recording.

If the separate housing part is U-shaped in cross-section, there is also the advantageous possibility of forming the housing part itself as a connecting means for planar housing parts or nonplanar housing parts. This connecting means can also be used temporarily, for example during assembly of the cassette halves before other connecting means produce a firmer connection. This connecting means may also have a partial connecting function for the finished cassette, and a separate housing part in its intended position may additionally be, connected via locking means, etc. to the planar or nonplanar housing parts which is also detachable therefrom, as indicated above, in order to be replaced by a different, separate housing part.

For such a connecting function of the separate housing part, the latter may be formed, for example, with flexible or springy and/or lower arm parts of the U-shape, so that the housing parts can be clamped together. The separate housing part can, however, also be formed with clamping means which generate such a clamping force, for example at least one inner leaf spring. It is also possible to produce the separate housing part with arm parts whose free ends are produced having a spacing which is smaller than the length of the connecting arm part of the U-shape, in order to generate an initial tension for a clamping effect.

The separate housing part may also advantageously be produced as a self-connecting part from flexible plastic material or springy metal material.

With the compact cassette according to the invention, it is possible to obtain the following advantages over conventional compact cassettes in Comparative Experiments:

In Comparative Experiments, the applicant's commercial compact cassettes were compared with novel compact cassettes, with the results below. Both compact cassettes were stored at elevated temperatures (WL) for 8 hours at 85° C., and the azimuthal angle of an audio head gap was measured relative to the tape of each cassette before and afterward.

The values in the Table below were obtained:

TABLE

| Type of CC | Azimuthal angle before SEL [Angular minutes]* | Azimuthal angle after WL |
|---|---|---|
| Commercial CC | <3.5' | <5 |
| CC according to the invention | <1.5' | <2.5' |

*1 angular minute is equal to one sixtieth of a degree.

Use of the invention thus results in the following:
Improvement in the azimuthal angle by a factor of $\geq 2$, i.e. a reduction in the azimuthal error due to the cassette by a half or more.

For commercial compact cassettes made in a series production, there are no known comparable measures for achieving such an improvement in the azimuthal angle or in the precision of tape guidance- at a similarly low cost.

For the purposes of the present invention, magnetic tape cassettes are all types of audio, video, data and instrumentation tape cassettes for which the measures of the invention can be used.

We claim:

1. A magnetic tape cassette comprising bottom, lid, front, back and side walls and comprising two rotatably mounted coplanar hubs and a magnetic tape to be wound and unwound between the hubs and to be scanned by at least one magnetic head on a cassette apparatus, and a housing having first and second housing parts of molded plastic comprising bottom and lid walls and tape guide elements, said housing having a raised portion adjacent to the front wall of the housing parts for accepting the at least one head; said tape guide elements being located within the contour of the raised portion of the housing, said first and second housing parts forming the bottom and lid walls respectively have been molded as essentially planar parts without any inhomogeneities affecting the planarity of their inner surfaces, said essentially planar parts having molded thereon said back and side walls and said guide elements, and said raised portion and substantially said front wall of the housing have been molded as a third separate housing part of U-shape for at least partially connecting said first and second housing parts together.

2. A cassette as claimed in claim 1, wherein the third separate housing part is connected to the planar housing parts by button or clamping connections.

3. A cassette as claimed in claim 1, wherein the third separate housing part is connected to the planar housing parts by adhesive bonding or welding.

4. A cassette as claimed in claim 1, wherein the third separate housing part is an injection molded thermoplastic.

5. A cassette as claimed in claim 1, wherein the third separate housing part consists of metal.

6. A cassette as claimed in claim 1, wherein positioning webs for interacting with corresponding indentations/webs on the outside of the planar housing parts are provided on at least one inner wall of the third housing part.

7. A cassette as claimed in claim 1, wherein ribs at right angles to the length of the front are provided close to the front orifices of the assembled third housing part or parts for restricting the tape loop.

8. A cassette as claimed in claim 1, wherein the planar housing parts possess, in the region of the third separate housing part, wall parts which engage each other to form a positive connection.

9. A cassette as claimed in claim 1, wherein the third separate housing part consists of plastic and metal material.

10. A cassette as claimed in claim 9, wherein the third separate housing part consists of plastic and metal material, the colors of which are different from that of the planar housing parts.

11. A cassette as claimed in claim 1, wherein the third separate housing part consists of separate housing parts.

12. A cassette as claimed in claim 1, wherein the third separate housing part consists of a resilient thermoplastic material.

13. A magnetic tape cassette comprising bottom, lid, front, back and side walls and comprising two rotatably mounted coplanar hubs and a magnetic tape to be wound and unwound between the hubs and to be scanned by at least one magnetic head on a cassette apparatus, and a housing having first and second housing parts of molded plastic comprising bottom and lid walls and tape guide elements, said housing having a raised portion adjacent to the front wall of the housing parts for accepting the at least one head; said tape guide elements being located within the contour of the raised portion of the housing, said first and second housing parts forming the bottom and lid walls respectively have been molded as essentially planar parts without any inhomogeneities affecting the planarity of their inner surfaces, said essentially planar parts having molded thereon said back and side walls and said guide elements, and said raised portion and substantially said front wall of the housing have been molded a third separate housing part of U-shape for at least partially connecting said first and second housing parts together, which third separate housing part has front orifices for the entry of the at least one magnetic head.

14. A cassette as claimed in claim 13, which has ribs provided close to the front orifices for restricting and guiding the magnetic tape guided along the front orifices.

* * * * *